Jan. 22, 1963  B. A. SHOOR  3,075,098

ACCELEROMETER

Filed Dec. 26, 1957

BERNARD A. SHOOR,
INVENTOR.

BY Reed & Lawlor
ATTORNEY.

United States Patent Office 3,075,098
Patented Jan. 22, 1963

3,075,098
ACCELEROMETER
Bernard A. Shoor, Pasadena, Calif., assignor to Endevco Corporation, Pasadena, Calif., a corporation of California
Filed Dec. 26, 1957, Ser. No. 705,182
6 Claims. (Cl. 310—8.4)

This invention relates to improvements in measuring instruments, and particularly to improvements in accelerometers which employ as an acceleration-responsive element a body of pressure-sensitive material, such as a piezoelectric crystal, which possesses an electrical characteristic or condition which varies with the compression thereof.

Accelerometers are employed in the testing and design of aircraft and other machines by mounting the accelerometers on the machines in question and then vibrating the machines. It is highly desirable to employ for this purpose an accelerometer which responds to linear accelerations in one predetermined direction, but which is substantially insensitive to components of accelerations that may exist in a transverse direction.

Accelerometers have been made from discs of polarized lead-stabilized barium titanate ($BaTiO_3$). Such material is very suitable because the temperature coefficient of its piezoelectric constant is relatively low, but its Curie point is relatively high. Such piezoelectric discs and also many other bodies of pressure-sensitive material are pre-stressed during assembly. Such discs are connected to conductors in such a way that an electrical output is generated across the conductors when the compression of the disc is either increased or reduced, as the case may be.

I have found that it is very desirable to pre-stress the sensitive element along its pressure-responsive axis and to avoid the creation of any residual stress in directions transverse to that axis. Unless precautions are taken to avoid the creation of transverse components of compression, the instrument is not only sensitive to transverse accelerations, but also exhibits a sensitivity to transverse acceleration which varies with the direction in which the transverse acceleration is applied. These difficulties are avoided with this invention.

One of the objects of this invention is to provide such a measuring instrument with an arrangement for pre-stressing the pressure-sensitive element uniformly and substantially entirely in the direction of the pressure-sensitive or acceleration axis.

Another object of the invention is to provide an accelerometer of the type described with means for attenuating the transmission of noise to the pressure-sensitive discs.

Another object of this invention is to provide an accelerometer of the type described in which the piezoelectric crystals are highly compressed with a rugged compact spring.

The foregoing and other objects of this invention, together with various advantages thereof, will become apparent from the specification taken in connection with the accompanying drawings, in which.

Figure 1:
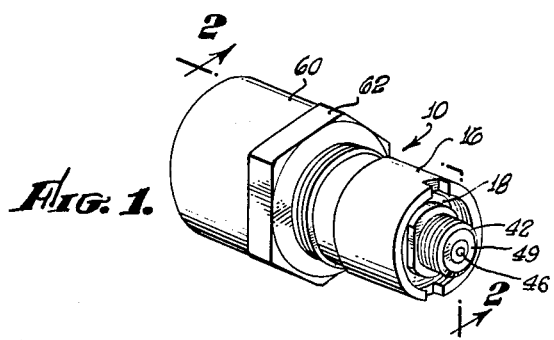
FIG. 1 is an isometric view of an accelerometer embodying this invention.
Figure 2:
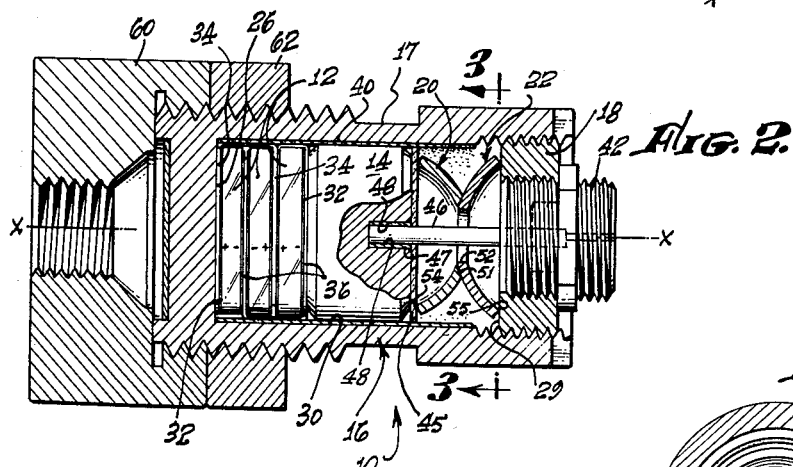
FIG. 2 is a longitudinal cross-sectional view of the accelerometer taken on the plane 2—2 of FIG. 1.
Figure 3:
FIG. 3 is a cross-sectional view of the accelerometer taken on the plane 3—3 of FIG. 2.
Figure 3:
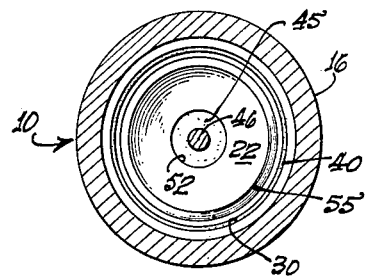
Figure 4:
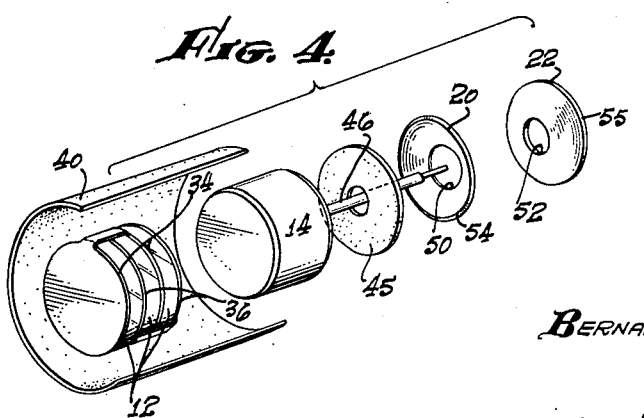
FIG. 4 is an exploded view showing parts of the accelerometer.

In the drawings, and particularly in FIGS. 1 and 2, there is shown an accelerometer 10 embodying the features of this invention. The accelerometer 10 includes a stack of pre-stressed pressure-sensitive discs 12, such as piezoelectric crystals, and an inertia member 14 mounted in a case 16. It also includes resilient means in the form of two Belleville springs 20 and 22 that are compressibly arranged between the inertia member 14 and the case in order to pre-stress the discs 12. The Belleville springs are shaped, designed, and arranged so as to provide a self-aligning joint between the inertia member 14 and the case 16 and so as to provide a rugged but soft spring capable of applying a high compression load to the piezoelectric crystals.

More particularly, the case 16 comprises a metal base member 17 and a retaining ring and plug 18 threadibly engaged therewith. The base 17 is of cylindrical configuration, being provided with a recess that forms a cylindrical cavity into which all of the parts including the pressure-sensitive discs 12, the inertia member 14, and the Belleville springs 20 and 22 are inserted in the order named and within which they are held by means of the retaining ring 18. The inner end wall 26 of the case 16 and the inner wall 29 of the ring 18 are flat and are arranged in parallel planes. The side wall 30 of the base 17 is of circular cylindrical shape.

An odd number of discs is employed, such as three discs as shown. The three pressure-sensitive discs are of cylindrical configuration, having flat mutually parallel faces 32 on opposite sides thereof. The discs may be in the form of piezoelectric crystals, such as barium titanate ($BaTiO_3$). The three discs are alternately arranged with their electric axes in opposed relationship, so that neighboring faces of the adjacent discs develop like electric charges when the discs are subjected to pressure. A first pair of interconnected metallic plates 34 are arranged between the positively polarized faces of the piezoelectric discs 12. A second pair of interconnected metallic plates 36 are arranged between the negatively polarized faces of the piezoelectric discs.

The first pair of metal plates 34 are in electrical contact with the case 16, the ring or plug 18, and a threaded connector or fitting 42, which are composed of metal. A flexible metallic wire 46 is fastened at one end to the metal inertia member 14. The inner end of the wire 46 is soldered to a sleeve 47 which is press-fitted into an axial bore 48 at the end of the inertia member 14 remote from the piezoelectric discs 12. This wire 46 projects axially through an insulating bushing 49 within the fitting 42. The wire 46 and the fitting 42 thus form two co-axial conductors that are connected to oppositely polarized faces of the piezoelectric discs 12. A sheet 40 of insulating material encircles the discs 12 and the inertia member 14, insulating them from the cylindrical wall 30 of the case. An insulating disc 45 in the form of sheet mica is mounted between the metallic inertia member 14 and the inner Belleville spring 20.

The entire arrangement of the accelerometer possesses a cylindrical symmetry about the axis X—X, the discs 12, the inertia member 14, the conductor 46, the Belleville springs 20 and 22, the case 16, the plug 24, and the connector 42, all being arranged co-axially along the axis X—X. The two Belleville springs 20 and 22, it will be noted, are provided with central apertures 50 and 52 through which the conductor 46 extends. The piezoelectric discs 12 are arranged with their pressure-sensitive axes aligned with the axis X—X.

The two Belleville springs 20 and 22 are in the form of centrally-apertured bells that are of uniform thickness and are in the shape of truncated spherical segments, and the opposite surfaces of each of the Belleville springs are curved and parallel, or concentric, each of the springs being concavo-convex. The central aperture 50 of the inner spring 20 is larger than the central aperture 52 of the outer spring 22. The outer side or the outer surface at the edge of the aperture 50, that is, the part of the aperture 50 on the convex side of the spring 20, is spherically shaped so that it "nests" or mates with the outer spherical convex surface of the spring 22. The peripheral lip 54 of the inner spring 20 engages the insulating disc 45, and the lip 56 of the outer spring 22 engages the inner surface 29 of the ring or plug 18. The two springs are arranged in oppositely-facing outwardly-concave positions, and the springs are compressed between the ring or plug 18 and the insulating disc 45.

A fastener in the form of a screw holder 60 and a locknut 62 are arranged at the base of the case 16 to enable mounting of the accelerometer firmly upon an article such as a machine member or other element which is subjoce to vibratory movement or other acceleration.

When the case vibrates relative to the inertia mass 14 the discs 12 are alternately compressed and extended along the axis X—X, thereby producing an undulatory electrical voltage across the conductors 42 and 46 which varies in accordance with the pressure exerted on the disc 12. A pressure is also applied even when the case is subjected to steady acceleration.

The two mating surfaces of the Belleville springs are lubricated by means of a silicone oil to facilitate relative movement of the springs. The two nested springs may rotate and thereby slide relative to each other during the assembly of the accelerometer by virtue of the rotation of the plug 18 within the case 16. The two springs may also rock and thereby slide relative to each other when the accelerometer is subjected to transverse vibration. In any event, the two Belleville springs are thus mounted in a self-aligning arrangement, the two mating surfaces, in effect, providing a universal joint.

By virtue of the self-aligning feature of the Belleville springs, when the accelerometer is assembled, rotation of the plug 18 presses the spring 20 against the insulating disc 45 and thus forces the inertia member 14 to apply a uniform pressure over the area of the piezoelectric discs 12. As a result, the stress applied to the piezoelectric discs 12 is parallel to the pressure-sensitive axis X—X and there is substantially no transverse stress. For this reason, and because of the fact that the Belleville springs, in effect, constitute a universal joint, the accelerometer is only slightly sensitive to transverse accelerations, and this sensitivity is uniform in all radial directions. In the best embodiment of the invention now known to me, the elastic constant of the compound spring that is formed by the two Belleville springs is very low compared with the elastic constant of the stack of piezoelectric discs, and is very small compared to the elastic constant of the case.

In practice the elastic constant of the compound spring is made less than about one-tenth of the elastic constant of the piezoelectric discs. Also, in practice the constant of the case is made at least about ten times the elastic constant of the stack of piezoelectric discs. The term elastic constant refers to force per unit displacement along the pressure-sensitive axis X—X. Thus the elastic constants of the springs, the stack of crystals, and the case may be 50,000 lbs./in., 500,000 lbs./in., and 5,000,000 lbs./in., respectively. The case is very stiff and the spring is very soft compared with the stack of crystals.

Thus, in accordance with this invention, an accelerometer is produced which is relatively free of disturbances otherwise produced by transverse vibrations, such as those present in the device under test and such as those that might otherwise be produced by airborne noise. Furthermore, with this invention the piezoelectric discs are substantially insulated from the external vibrations that might otherwise be transmitted to them through the Belleville springs 20, 22.

By employing a pair of oppositely facing Belleville springs, a softer spring is produced than if only a single Belleville spring were employed without sacrifice of individual spring length. The use of the two Belleville springs also reduced effects that change in ambient temperature would otherwise have on the magnitude of the loading of the piezoelectric discs.

It will be understood, in view of the foregoing description and explanation, that the accelerometer of this invention may be modified in many ways without departing from the scope of the invention, as defined by the appended claims. More particularly it will be understood by those skilled in the art that many changes may be made in the details of construction, the nature of the materials, the size and shape of various parts of the accelerometer and the physical constants of the parts without departing from the invention.

The invention claimed is:

1. In a measuring instrument:
   a disc composed of pressure-sensitive material arranged in a case,
   said disc having substantially parallel faces on opposite sides thereof,
   said disc being adapted to respond to pressures applied thereto along the axis of said disc that is normal to the faces thereof,
   said case being provided with substantially parallel flat faces,
   said disc being in contact with one of said flat faces; and
   a pair of oppositely facing outwardly-concave concavo-convex metallic spring elements compressibly arranged between said disc and the other flat surface of said case for pre-stressing said disc in the direction of said sensitive axis, one of said spring elements having an aperture larger than the aperture of the other spring element and shaped to slidably receive the other spring element in rocking relation.

2. A measuring instrument comprising:
   a disc composed of pressure-sensitive material arranged in a case,
   said disc having substantially parallel faces on opposite sides thereof,
   said disc being adapted to respond to pressures applied thereto along the axis of said disc that is normal to the faces thereof,
   said case being provided with substantially parallel flat faces,
   an inertia member having flat faces on opposite sides thereof,
   said disc being mounted between a flat face of said case and a flat face of said inertia member,
   a pair of outwardly-concave concavo-convex spring elements compressibly arranged between the other flat face of said inertia member and the other flat surface of said case for pre-stressing said disc in the direction of said sensitive axis, said spring elements having central apertures, said spring elements having a pair of nested slidably and rotatably engaged mating surfaces encircling said apertures, one aperture being larger than the other and thus nesting the central portion of one disc in the other in rocking relation, thereby providing a self-aligning joint between said case and said inertia member.

3. A measuring instrument comprising:
   a body composed of pressure-sensitive material and an inertia member arranged in a case, said body of pressure-sensitive material being adapted to respond to pressures applied thereto along a sensitive axis, and spring means in said case adapted to hold said body of pressure-sensitive material in place in said case in pre-stressed condition, said body of pressure-sensitive material being arranged between a wall of said case and said inertia member,
   said spring means comprising a pair of centrally apertured concavo-convex spring elements compressibly arranged between said inertia member and another wall of said case,
   said case and said inertia member being arranged in electrical contact with parts of said body that are spaced apart along said axis, and a conductor electrically connected to said inertia member and extending through the central apertures and through said case.

4. An instrument as in claim 3 wherein said concavo-convex spring elements are arranged in opposed relation with their central convex portions contiguous and possessing said central apertures.

5. A measuring instrument comprising:

a body composed of pressure-senstive material and an inertia member arranged in a case, said body of pressure-sensitive material being adapted to respond to pressures applied thereto along a sensitive axis, and spring means in said case adapted to hold said body of pressure-sensitive material in place in said case in pre-stressed condition, said body of pressure-sensitive material being arranged between a wall of said case and said inertia member, said spring means comprising a pair of centrally apertured concavo-convex spring elements compressibly arranged between said inertia member and another wall of said case, said spring elements abutting each other at two mutually slidable rockingly nested parts of their surfaces, thereby providing a self-aligning joint between said case and said inertia member.

6. An instrument as in claim 5, wherein an electrical conductor extends through said central apertures and is free from contact with said spring elements.

References Cited in the file of this patent

UNITED STATES PATENTS

| | | |
|---|---|---|
| 2,367,826 | Kubaugh | Jan. 23, 1945 |
| 2,374,403 | Yarnall | Apr. 24, 1945 |
| 2,411,401 | Welch | Nov. 19, 1946 |
| 2,438,708 | Kuenstler | Mar. 30, 1948 |
| 2,592,703 | Jaffe | Apr. 15, 1952 |
| 2,639,393 | Birt et al. | May 19, 1953 |
| 2,724,588 | Sheets | Nov. 22, 1955 |

OTHER REFERENCES

Guttwein: "Self-Generating Accelometer," Electronics, October 1951, pp. 120–23.